United States Patent [19]

Hensley et al.

[11] 4,205,500

[45] Jun. 3, 1980

[54] WEAR RESISTANT INTERLOCKING TILE

[75] Inventors: William G. Hensley, Daisy; Paul E. Snyder, Chattanooga, both of Tenn.

[73] Assignee: Minnesota Mining and Manufacturing Company, St. Paul, Minn.

[21] Appl. No.: 743,336

[22] Filed: Nov. 19, 1976

[51] Int. Cl.² .................................................. E04C 1/10
[52] U.S. Cl. ........................................ 52/593; 428/49; 428/192; 428/900
[58] Field of Search ................................ 428/47–50, 428/192, 900; 52/248, 270, 591, 593

[56] References Cited

U.S. PATENT DOCUMENTS

| 229,766 | 7/1880 | Smith | 52/593 |
|---|---|---|---|
| 1,365,162 | 1/1921 | Ferguson | 52/591 |
| 1,705,338 | 3/1929 | Playford | 52/248 |
| 1,984,393 | 12/1934 | Brown | 52/593 X |
| 2,155,026 | 4/1939 | Tracy | 52/270 X |
| 4,073,318 | 2/1978 | Close et al. | 428/49 X |

*Primary Examiner*—Henry F. Epstein
*Attorney, Agent, or Firm*—Cruzan Alexander; Donald M. Sell; Edward T. Okubo

[57] ABSTRACT

Interlocking wear-resistant tile are provided with rotatable tongue and groove mating edges. In preferred embodiments two adjacent edges of each tile are tongues and two other adjacent edges grooves.

2 Claims, 5 Drawing Figures

WEAR RESISTANT INTERLOCKING TILE

This invention relates to a wear and abrasion-resistant tile for use in devices where it may be exposed to abrasion and wear in wet or dry conditions. The tile is particularly adapted for use in wet or dry grinding mills and for conduits where severe abrasion is encountered under any temperature conditions.

Numerous methods have been proposed for combatting problems associated with abrasion of the container in grinding mills and various mixing and pulverizing mills. Particular consideration is here given to dynamic devices such as rotary grinding mills and to static devices such as conduits in which there is motion of more or less abrasive material in suspension in a suitable fluid medium, i.e., gas or liquid.

A constant problem in lining such devices is the selection of a lining material which shows satisfactory wear and abrasion resistance over prolonged time. A particularly desirable refractory for wear resistance because of its hardness is alumina. A problem associated with the use of abrasion-resistant materials such as alumina is that means must be found for applying them in locations where they can be valuable. It is not convenient to fabricate large objects of alumina and in use such structures might well be subjected to destructive mechanical action although fully capable of withstanding abrasion.

It is an object of this invention to provide an abrasion and wear resistant form, particularly a tile, of refractory for lining grinding mills, conduits or relatively flat surfaces. Other objects will become evident herein elsewhere.

It has been found that a very useful, wear and abrasion-resistant article for application to flat and curved surfaces is provided by interlocking refractory tile of particular configuration which can be applied in interlocking relationship.

The novel tile of this invention are of the structure shown in FIG. 1 with two convex and two mating concave sides forming rotatable tongue and groove joints and a thickness usually less than one quarter the lesser edge length.

In the tile shown in FIG. 1 it will be seen that small ledges are formed along the convex edges and that the edges of the concave portions also are flattened. These structures are termed generally herein as ledges or shoulders. They have as one advantage that the dies used for compression do not need knife edges and as another that the ledges or shoulders of mating sides act as a stop to rotation of one tile with respect to the other. By making the arc of the male edge or tongue greater than that of the female edge or groove the respective shoulders or ledges are not in contact as is the case with the usual tongue and groove joint thus providing rotatability. The straight line distances between ledges are the chords of the tongues and grooves and the arcs are the distances along the circular pathway or the angle enclosing that part.

The center of curvature of the tongues and grooves lies in back of the chord, that is on the side away from the tongue within the tile and away from the groove at the other side of the tile. This means that the arcs are always less than 180°.

It is important that the mating surfaces be of radii of curvature about half the thickness of the tile and that the chord and arc on the concave side be less than the chord and arc of the convex side. Both male and female members are made with substantially the same radius of curvature. It is possible to produce useful rotatable joints using radii of curvature more or less than one half the thickness of the tile but the integrity of the joint is compromised outside the range of radii of from one third to two thirds the tile thickness. Preferably the radius is from about 0.4 to 0.6 of the thickness and this is intended to be understood by "about one half." In all cases the chord of the concave (female) side must be less than that of the convex (male) side to permit rotation or; expressed differently, the height of the tongue must be greater than the depth of the groove. This difference should generally be about 5% or more the thickness of the tile and may be up to 30% or more and is preferably 10% to 20% the thickness of the tile. In particularly useful embodiments, the center of curvature for the convex or male edges will be about 1/6 the thickness in back of the ledges and of the concave or female edge about ¼ to 1/5 the thickness behind the ledges. The height of the convex or tongue edge is thus about ⅓ the thickness of the tile and depth of the concave groove side about ¼ to 1/5 the thickness of the tile. In some instances it is contemplated that only one pair or opposite edges will be concave and convex respectively.

Tile of the invention may be adhered to a substrate to provide a composite which can be applied to a surface, when the substrate is magnetic and the surface is iron or steel adhesion is accomplished by magnetic force. If greater adhesion is needed than can be conveniently be provided by the magnetic force or if a non-magnetic substrate is provided, an adhesive may also be used.

A suitable flexible magnetic sheet material is available commercially from Minnesota Mining and Manufacturing Co. under the trademark PLASTIFORM. This material includes a body portion of rubber in which barium ferrite particles are embedded during production of the sheet. The material is available in thicknesses of from about 0.8 to 3 mm and in widths up to about 30 cm. The sheet material is processed so as to confer magnetic properties on the faces thereof either each face being all of one pole or each face being made up to have alternate areas of the same polarity with intermediate areas of opposite polarity resulting in flux changes. There may be from about 3 to about 30 flux changes for 3.5 cm. lengths. Although either type of polarity may be used it is generally preferred to use material of the latter (alternating) type of polarity and particularly such material which is available commercially with a coating of pressure sensitive adhesive (and low adhesion backing) on one side. Other adhesives may be used rather than pressure sensitive adhesives but in general any adhesive should not become brittle. Tacky and agressive prepolymerized adhesives are therefore preferred over adhesives which polymerize in situ such as epoxy resins.

Alumina of 85% or greater purity is particularly preferred as material for making interlocking tile of the invention because of its combination of relatively high melting point and greater hardness and hence resistance to wear and abrasion. Other compositions such as cordierite, mullite, silicon carbide, silicon nitride, alumina-chromia compositions, cermets such as titanium carbide-alumina, and other wear-resistant materials can be used in many applications.

Dimensions of tile can be varied over considerable ranges depending on the particular application. Although the tile is shown as flat and essentially square, it will be understood that rectangular shapes generally are useful. Furthermore, it is within the scope of the invention to employ a tile which has a curvature of radius no greater than that of the surface to which applied. Generally one convex edge of each tile will face upstream, i.e., toward the source of flow.

The invention is further described by reference to the drawings wherein

Figure 1:
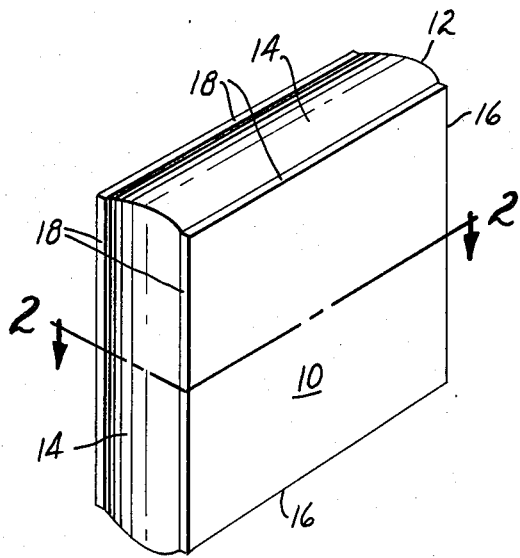
FIG. 1 shows interlocking tile of the invention
Figure 2:
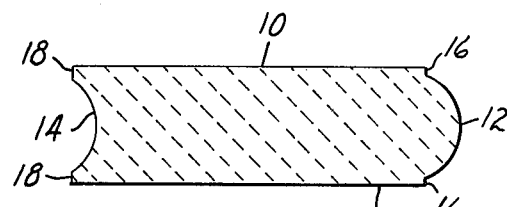
FIG. 2 shows a cross-section at 2—2 of the tile of FIG. 1

The tile of FIGS. 1 and 2 has faces (10), convex sides (12) with ledges (16) and concave sides (14) with ledges (18).

Figure 3:
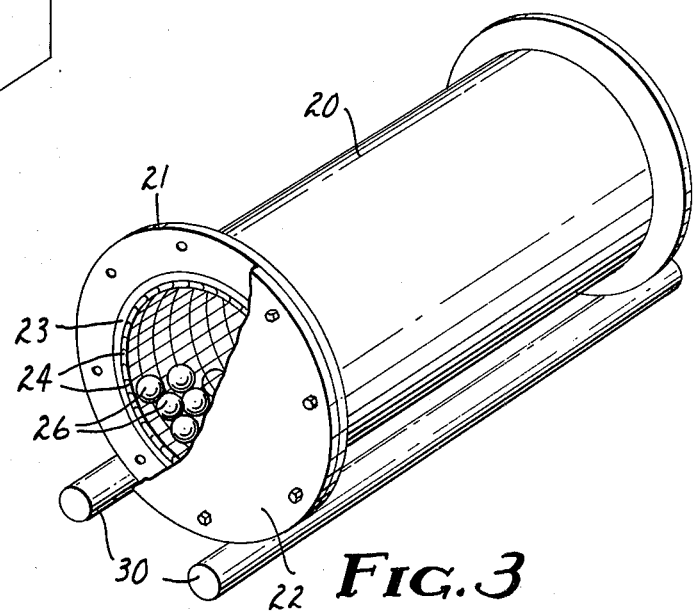
FIG. 3 shows a grinding mill lined with the composite wear resistant sheet formed from tile of the invention

A steel grinding mill (20) having flange (21), shown diagrammatically in FIG. 3 with one head (22) broken away, is lined with sheets of magnetic elastomer (23) about 30 cm square bearing about 500 alumina tile (24) about 1.6 cm square and rotated dry on rollers (28) with steel balls (26) at about 64 rpm for 216 hours. There is some nicking of thin edges of individual tile but no evident wear. The tile is blackened from wear on the steel balls giving finely divided iron which may be partially oxidized. There is no loss of magnetism in the sheet material under the repeated impact of the steel balls. The sheets of tile are readily stripped away, however, when desired. This is a particularly useful feature in cleaning the mill, particularly if several different materials are to be milled without cross contamination. For special purposes tile can be constructed of special materials and used with balls of the same material to obtain extremely low or negligible contamination. For example tile and balls can be made of beryllia when a high purity beryllia composition is to be milled.

When applying wear-resistant composite sheets of the invention it may happen that some areas are not covered because of dimensional differences. It is usually desirable to mask any of the steel drum which is not covered by wear-resistant covering. This can be done by applying rubber or elastomeric compositions to the exposed steel.

Figure 5:
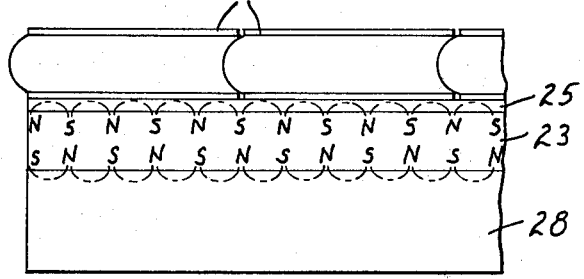
FIG. 5 shows a section of 4—4 of the angled steel sheet of FIG. 3.
Figure 4:
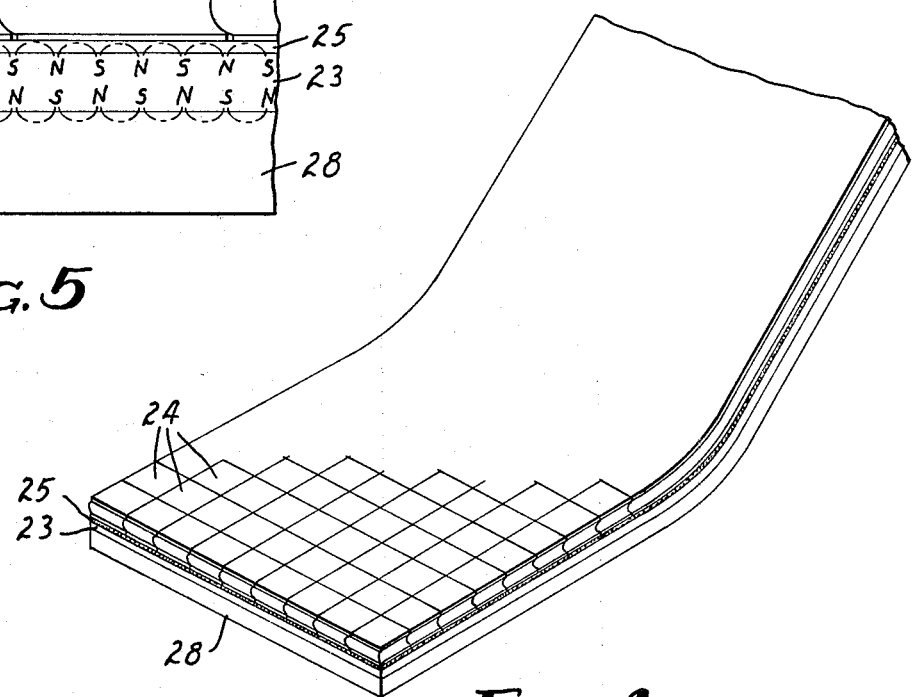
FIG. 4 shows an angled steel sheet covered by composite sheet material formed from tile of the invention

In FIGS. 4 and 5 is shown a wear plate or deflector plate for attachment to the outer surface of an elbow for a conveyor line. It will be seen that steel plate (28) is coated by tile (24) on a magnetic elastomeric backing. If desired a simple elastomeric backing can be employed to which tile are adhered and which is then attached to the steel backing by an adhesive. In FIG. 5 is shown a much enlarged section of the deflector plate of FIG. 4 showing bonding of tile (24) to magnetic backing (23) by adhesive (25) and further how the magnetic dipoles achieve banding to steel plate (28). In actual experience a plate such as this is found to outwear a simple steel deflector plate by several times. This results in great conveniences in replacement costs and maintenance expenses. Other uses contemplated include linings for chutes delivering abrasive materials such as coal, cement clinker, ores, gravel, rocks and the like.

What is claimed is:

1. Refractory abrasion resistant interlocking tile having two adjacent edges convex with tongues and two adjacent edges concave with grooves and a thickness less than any side, each edge being bordered by narrow ledges or shoulders at each surface, the radii of curvature of tongues and grooves being substantially the same and being from one third to two thirds the thickness of said tile with centers of curvature so placed that the arc of the convex edges between ledges or shoulders is greater than the arc of the concave edge between ledges or shoulders.

2. Refractory abrasion resistant interlocking tile according to claim 1 wherein the height of convex edges above adjacent ledges or shoulders is substantially about one third the thickness of the tile and the depth of concave edges below adjacent ledges or shoulders is substantially one fourth to one fifth the thickness of the tile.

* * * * *